United States Patent [19]

Grossman

[11] Patent Number: 4,577,080

[45] Date of Patent: Mar. 18, 1986

[54] COFFEE MAKER ADAPTED FOR USE IN A MICROWAVE OVEN

[75] Inventor: M. Gary Grossman, Fort Lee, N.J.

[73] Assignee: GEE Associates, Fort Lee, N.J.

[21] Appl. No.: 713,460

[22] Filed: Mar. 19, 1985

[51] Int. Cl.⁴ ............................................. H05B 6/80
[52] U.S. Cl. ...................... 219/10.55 E; 219/10.55 R; 99/306; 99/300; 99/DIG. 14; 426/241
[58] Field of Search ................ 219/10.55 E, 10.55 R; 99/306, 305, 300, 451, DIG. 14; 426/241, 243, 234; 239/75

[56] References Cited

U.S. PATENT DOCUMENTS

| | | | |
|---|---|---|---|
| 2,560,523 | 7/1951 | Efford | 239/75 X |
| 3,587,444 | 6/1971 | Godel et al. | 99/306 X |
| 4,023,164 | 5/1977 | Delaney | 239/75 X |
| 4,104,957 | 8/1978 | Freedman et al. | 219/10.55 E X |
| 4,381,696 | 5/1983 | Koral | 219/10.55 E X |
| 4,386,109 | 5/1983 | Bowen et al. | 219/10.55 E X |

*Primary Examiner*—Philip H. Leung
*Attorney, Agent, or Firm*—Hedman, Gibson, Costigan & Hoare

[57] ABSTRACT

A drip-type coffee maker adapted for use in a microwave oven. The coffee maker includes a container for positioning on or above a receptacle and has two compartments, an upper reservoir for water and a lower filter element for holding fresh coffee grounds. A partition wth at least one perforation sealed with a thermally responsive non-toxic substance separates the two compartments. When the water is heated to the desired brewing temperature in the microwave oven, the thermally responsive substance melts, allowing the heated water to flow from the upper reservoir through the coffee grounds and become freshly brewed coffee. The fresh coffee thereafter flows through the filter element and into the receptacle below.

14 Claims, 5 Drawing Figures

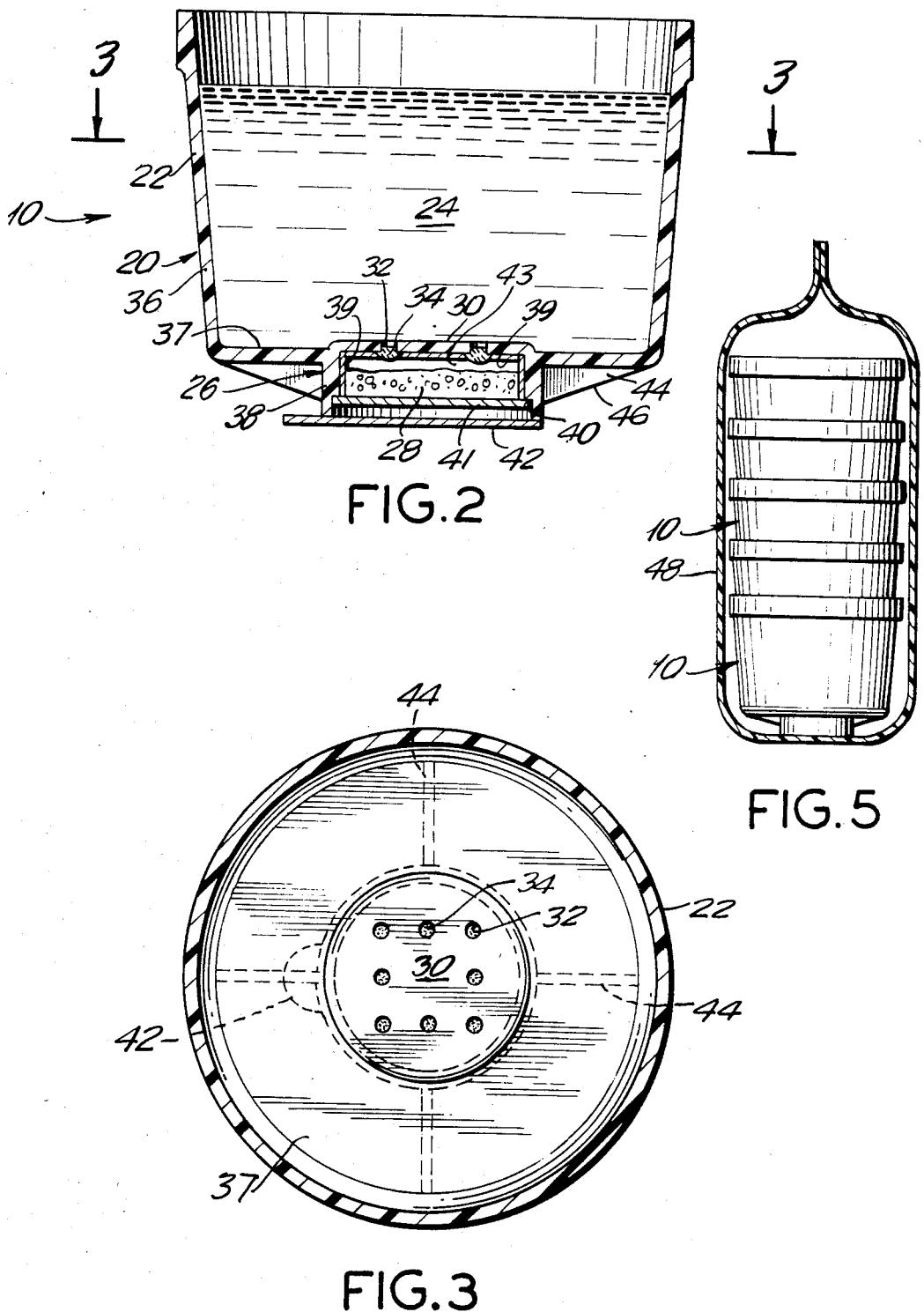

COFFEE MAKER ADAPTED FOR USE IN A MICROWAVE OVEN

BACKGROUND OF THE INVENTION

This invention is directed to a convenient, time saving coffee maker adapted for use in a microwave device. This invention also relates to a relatively inexpensive, simple, disposable, drip-type, microwave coffee maker adapted to dispense freshly brewed coffee directly into a cup, mug or the like.

The purchase and use of microwave ovens is growing geometrically. The realization by the public of the time saving and convenience of microwave ovens is resulting in record sales.

However, microwave coffee makers have not kept abreast with such growth because they do not offer the same advantages. Generally, the microwave coffee makers disclosed in patent literature are of full size, requiring the measuring out of specified amounts of coffee and water, depending on the desired number of cups, inserting the measured amount of coffee in a filtering element, filling a reservoir with the measured amount of water, and then assembling, closing or otherwise sealing the coffee maker before it is placed in a microwave oven. See, for example, U.S. Pat. Nos. 2,601,067, 4,104,957, 4,381,696 and 4,386,109. Plainly absent are the time saving and convenience features expected by users of microwave ovens.

In addition, the coffee makers disclosed in the identified patents generally are relatively complex and expensive. For example, the microwave oven coffee makers of the drip-type commonly include relatively complicated and expensive thermally controlled or manually operated valves. In operation, when the valve opens, water in an upper reservoir flows through coffee grounds in an intermediate filter element and becomes coffee which flows into and is retained in a lower pot or pitcher. The coffee maker is then removed from the microwave oven and coffee is be poured into cups or mugs. For example, the valve in U.S. Pat. No. 4,104,957 is a thermally operated valve which has numerous components and is designed to automatically open when the water in the reservoir has been heated to brewing temperatures by the microwave oven. The valve of U.S. Pat. No. 4,381,696, said to be an improvement, is opened manually before the coffee maker is placed in the microwave oven and before the water is at traditional brewing temperatures. Thus, available microwave coffee makers, generally, are relatively complicated and expensive, can prematurely allow the water to flow through the coffee grounds, and are not designed to brew and dispense coffee directly into a drinking receptacle, such as a cup or mug.

In sum, there is a need for a microwave coffee maker which is convenient and time saving, which is relatively inexpensive and simple, and which can dispense freshly brewed coffee directly into a cup, mug or the like while in a microwave oven.

SUMMARY OF THE INVENTION

In accordance with the present invention, there is provided a new and unique coffee maker which includes the advantages of microwave ovens, i.e., time saving and convenience, and which is simple and inexpensive. The coffee maker is particularly suited for use in microwave devices or ovens, and preferably is disposable and of the drip-type, brewing and directly dispensing coffee into a single cup, mug or the like, ready for drinking.

The coffee maker includes a container adapted to rest over or on a cup, mug or similar receptacle and has two compartments, an upper reservoir for holding water and a lower filter element for holding coffee grounds and for allowing the freshly brewed coffee to be dispensed directly into a cup or the like.

Separating the reservoir and filter element is a partition having at least one flow restricting perforation, and a thermally responsive, non-toxic substance over the perforation to prevent the flow of water therebetween until the water is heated to brewing temperatures. In a preferred embodiment, the non-toxic substance is a wax seal which melts when the water is heated to the desired temperature.

In use, water is placed in the reservoir and the container is positioned over or on a coffee receptacle, e.g., cup, mug, etc. and the assembly is placed in a microwave oven. When the water is heated to a temperature high enough to displace the non-toxic substance or melt the wax the heated water will flow in a restricted manner through the perforation and coffee grounds to become freshly brewed coffee. The fresh coffee thereafter flows through the filter element directly into the receptacle below. In doing so a substantial portion of the substance or wax can be trapped or retained by the coffee grounds and filter, and the freshly brewed coffee in the receptacle is ready for drinking.

BRIEF DESCRIPTION OF THE DRAWINGS AND DETAILED DESCRIPTION OF THE INVENTION

The following is a detailed description together with the accompanying drawings of an illustrative embodiment of the invention. It is to be understood that the invention is capable of modification and variation apparent to those skilled in the art within the spirit and scope of the invention.

FIG. 2 is a front elevational view, in section, of the coffee maker shown in FIG. 1;

FIG. 3 is a sectional view, taken along lines 3—3, of FIG. 2;

Figure 1:
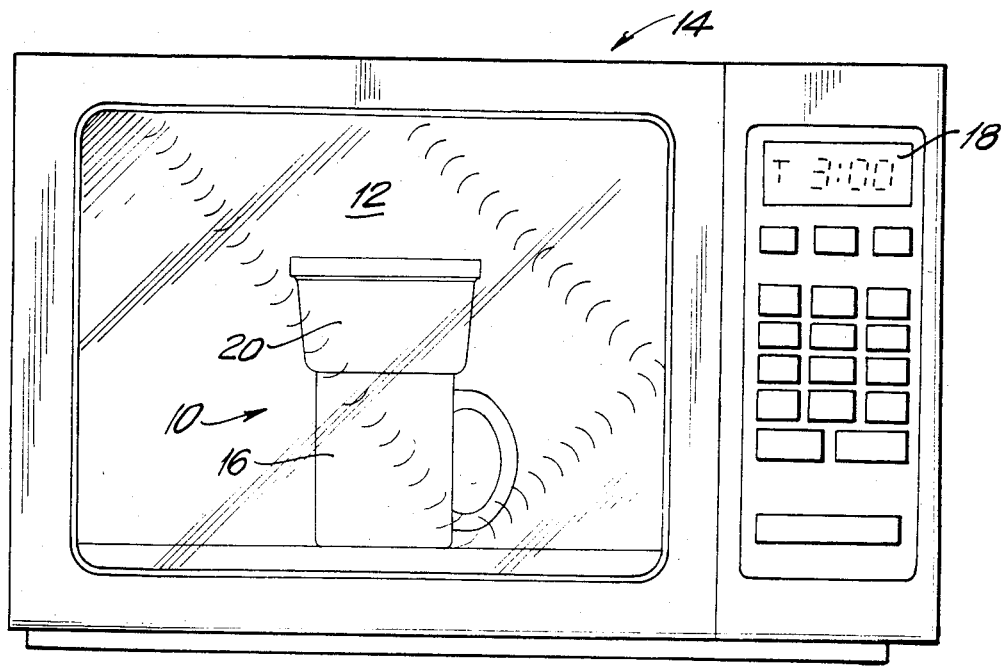
FIG. 1 is a front pictoral view of a microwave oven with a preferred embodiment of the coffee maker of the present invention therein.
Figure 4:
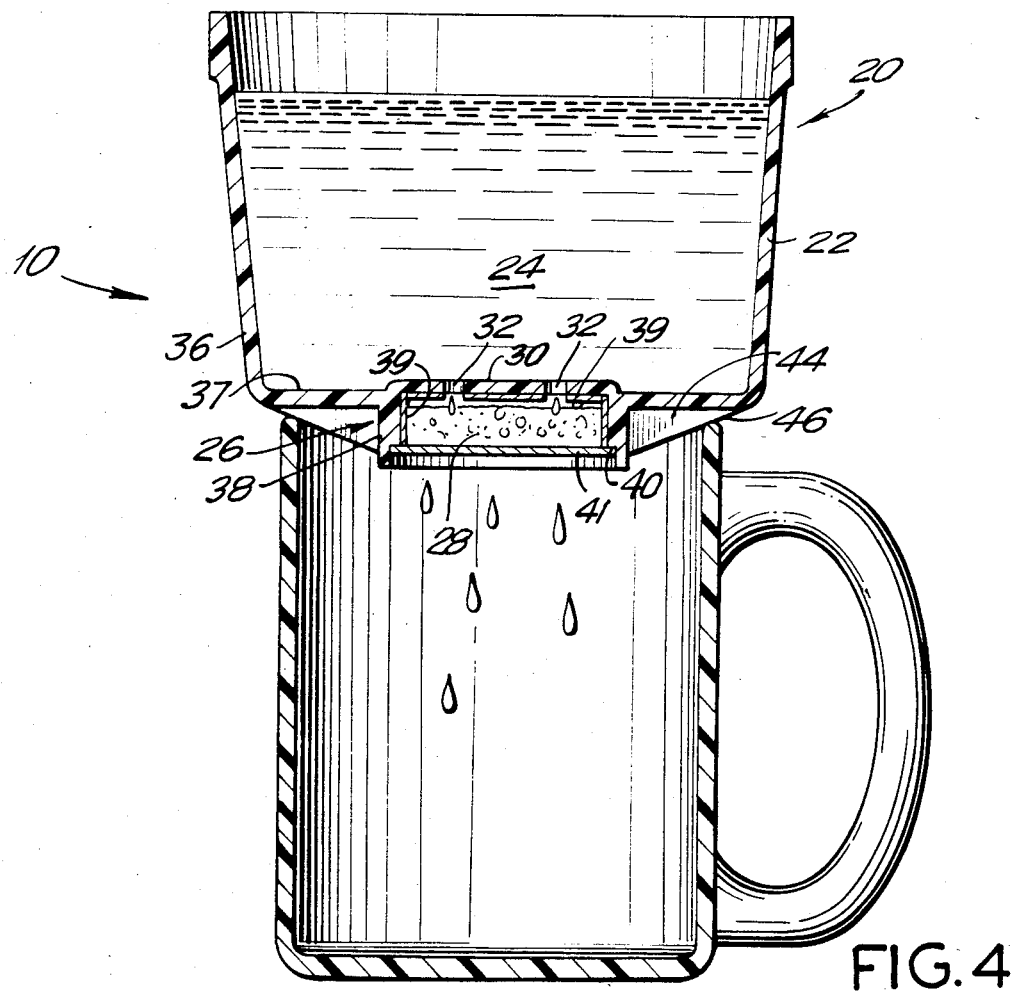

FIG. 4 is a front elevational view, in section, of the coffee maker and mug shown in FIG. 1 illustrating the operation of the present invention while the assembly is a microwave oven; and FIG. 5 is a front view, partially in section, illustrating another embodiment of the invention, wherein a plurality of coffee makers of the invention are packaged in a container for convenience and to maintain the freshness of the coffee.

Referring to the drawings and first to FIG. 1, there is shown a single cup microwave drip-type coffee maker 10 embodying the invention. The coffee maker 10 is positioned in a cavity 12 of a conventional microwave oven 14. A coffee receptacle 16 is situated below the coffee maker 10 for receiving the freshly brewed coffee. Microwave energy is provided to the cavity 12 by a magnatron (not shown). The duration of the microwave energy is controlled by a timer 18. Other conventional microwave features are not shown and described as they are well known in the art and are not part of the present invention.

Referring more particularly to FIG. 2, the coffee maker 10 comprises a container 20 having two compartments, an upper reservoir 22 for holding water 24 and a lower filter element 26 preferably for holding a pre-measured amount of coffee grounds 28 and providing sufficient space for the expansion of coffee grounds upon contact by the water 24 from the reservoir 22. A partition 30 having one or more perforations 32 separates the upper compartment 22 from the lower element 26. Prior to use, each perforation 32 is sealed with a thermally responsive, non-toxic seal 34 which is displaced or melted at the brewing temperature for the for the water, e.g., about 170° to about 210° F.

The upper compartment or reservoir 22, has generally cylindrical side walls 36 and a bottom wall 37 which includes the partition 30, and is open at the top for receiving water to be heated by the microwave oven 14. The walls 36 preferably are made of a microwave permeable material, such as polypropylene, polyethylene, foamed styrene, and polyurethane coated paper board.

Referring to FIG. 3, there is shown the bottom wall 37 of the reservoir 22 with the partition 30 centrally disposed therein. The partition 30 preferably includes a plurality of perforations 32. By increasing the number of perforations 32 while correspondingly decreasing the area of each perforation, the same restrictive flow of water through the perforations can be achieved while improving the distribution of the water over the coffee grounds. Thus, the number of perforations 32 can be increased or decreased as desired.

With respect to the thermally responsive seal 34, it covers or seals each of the perforations 32 and is capable of being displaced or melted by heated water at coffee brewing temperature. The thermally responsive seal 34 includes non-toxic waxes, such as natural and synthetic waxes including beeswax, paraffin, carnauba, polyethylene, high density polyethylene glycol, e.g., CARBO-WAX and other non-toxic plastic materials which melt at desired brewing temperatures for coffee deposited in or taped over the perforations 32.

The lower compartment or filter element 26 includes side walls 38 which extend downwardly from the bottom wall 37. The walls 38 and, if desired, the partition 30, except for each perforation 32, can include, or preferably can be lined with a microwave resistant material or barrier, such as aluminum foil 39, to limit the overheating or roasting of the coffee grounds in the filter element 26 during the microwave heating process. As shown, the filter element 26 is tubular with the perforated partition 30 across its upper end. Within the element 26 is an annular shoulder 40 for securing a porous bottom wall 41 secured thereon through which the brewed coffee is filtered. The wall 41 preferably is made from conventional filter paper for coffee which is adhesively secured to the annular shoulder 40, and the filter 41 further serves to trap or retain the thermally responsive non-toxic seal 34 which has melted and passed through the coffee grounds 28. As shown in FIGS. 2 and 3, the partition 30 and filter element 26 provide a chamber 43 with sufficient space for holding the dry coffee grounds and for allowing the expansion of the coffee grounds during brewing without binding or compacting thereof. By so doing, the expanded coffee grounds do not inhibit the flow of water therethrough. A removable tabbed freshness foil 42, such as aluminum foil, preferably spaced from the filter 41 can be adhesively affixed to the bottom rim of the walls 38 for preserving the freshness of the coffee grounds 28 prior to their use. As shown, the freshness seal 42 can be spaced from the filter 41 so that removal of the seal 42 will not adversely affect the filter 41.

The coffee maker 10 also can include means for positioning the coffee maker 10 above or on the receptacle 16. In the illustrative embodiment, the upper compartment 22 has a breadth greater than the breadth of the filter compartment 26 and a number of ribs 44 extend from the bottom wall 37 to the cylindrical walls 38. As shown, there are four equi-spaced triangular ribs 44 integral with the walls 37 and 38 having inwardly tapered lower surfaces 46 designed to rest upon the receptacle 16 and support the coffee maker 10 thereon.

In manufacture, the coffee maker 10 can be formed by conventional techniques, such as molding. Thereafter, the perforations 32 can be sealed by the thermally responsive non-toxic substance 34, and, preferably, the required amount of coffee can be pre-measured and placed in the chamber 43 of the element 26 and the filter 41 and freshness seal 42 added. If desired, the coffee does not have to be placed in the chamber 43 at the point of manufacture but can be added at any time prior to use. In such instance, the filter 41 can be of a removable type or it can be separately provided. Correspondingly, and if necessary or desired, the freshness seal 42 can be removable or separately provided.

In using the coffee maker 10 to brew a cup of fresh drip-type coffee, the procedure illustrated in FIG. 4 can be followed. The freshness seal 42 is removed and the upper compartment 22 of the container 20 is filled with tap water 24. The filled container 20 is then positioned on or above the receptacle 16 and the assembly is placed in the microwave oven 12 as shown in FIG. 1. The microwave oven 14 is set for a predetermined time on the timer 18. It has been found that in a 700 watt microwave oven, one cup (8 ounces) of tap water will reach 200° F. in about 2.5 minutes. When the water has been heated to the temperature at which the thermally responsive seal 34 is displaced or melts, i.e., between about 170°-210° F., the perforations 32 open and the heated water 24 flows through the perforations 32 and the coffee grounds 28 in the filter 26. There the heated water 24 dissolves a portion of the coffee grounds 28 to produce freshly brewed coffee. Substantial portions of the thermally responsive substance 34 are retained either in the coffee grounds 28 or on the filter 26. During this stage of the process, the microwave oven 12 turns off and the freshly brewed coffee continues to flow through the filter 41 and into the receptacle 16 below. The dripping process takes about two minutes. At this point, the assembly is removed from the microwave oven 12, the coffee maker 10 removed and discarded, and the coffee is ready for drinking from the receptacle 16.

While a single cup coffee maker is shown in the illustrative embodiment, it is to be understood that a larger coffee maker with a correspondingly larger receptacle may be employed. This embodiment of the invention can provide more than one cup of freshly brewed coffee in the receptacle from which individual cups of coffee can be poured.

Moreover, in another embodiment of the invention, the coffee makers 10 do not include the freshness seals 42. As shown in FIG. 5, the coffee makers 10 are placed in a freshness container or bag 48 in a nesting or nestling fashion and the bag 48 is sealed until a coffee maker 10 is needed. The bag 48 can include aluminum foil or other barrier means which maintains the freshness of the coffee in the coffee maker 10. In addition, the container 48 provides a convenient way to package a plurality of the coffee makers 10 whether or not the coffee makers 10 include freshness seals 42.

The invention in its broader aspects is not limited to the specific described embodiment and departures may be made therefrom within the scope of the accompanying claims without departing from the principles of the invention and without sacrificing its chief advantages.

I claim:

1. A drip-type coffee maker adapted to discharge fresh brewed coffee into a receptacle therebelow, comprising:
   a container having two compartments, including
   an upper reservoir adapted to hold water,
   a lower filter element adapted to hold coffee grounds and including a filter for the dispensing of brewed coffee therefrom, and
   a partition between said reservoir and filter element, including at least one flow restricting perforation therethrough sealed by a non-toxic meltable substance which melts at the temperature the water is heated for brewing coffee, whereupon the heated water will flow in a restricted manner through the perforation and the coffee grounds to become freshly brewed coffee which, in turn, will flow through said filter and into the receptacle therebelow.

2. The coffee maker of claim 1, wherein said coffee maker is adapted for use in a microwave device, and wherein said upper reservoir is defined by generally cylindrical microwave permeable walls, and is open at its top for receiving water.

3. The coffee maker of claim 2, wherein said microwave permeable walls comprise polypropylene, coated expanded styrene foam, polyethylene or polyurethane coated paper board.

4. The cpffee maker of claim 1, wherein said non-toxic meltable substance is a wax or plastic material which melts at a temperature of about 170° F. to 210° F.

5. The coffee maker of claim 4, wherein said non-toxic meltable material is a natural or synthetic wax.

6. The coffee maker of claim 1, wherein said partition includes a plurality of perforations sealed by said non-toxic meltable substance.

7. The coffee maker of claim 1, including means thereon for resting said container on the receptacle.

8. The coffee maker of claim 1, wherein said reservoir has a breadth which is greater than said lower compartment, and wherein the lower end of said reservoir includes means adapted to position said container on the receptacle therebelow.

9. The coffee maker of claim 1, wherein said filter element includes a chamber therein of sufficient size to hold and allow the expansion of the coffee grounds without compacting thereof during brewing.

10. The coffee maker of claim 1, wherein said filter element includes a microwave barrier which inhibits the roasting of coffee grounds therein during brewing.

11. The coffee maker of claim 1, wherein said filter is formed from paper secured to said filter element after a pre-measured amount of coffee is placed therein.

12. The coffee maker of claim 1 including a tabbed freshness seal is removably affixed to said filter below and spaced therefrom.

13. The coffee maker of claim 1, wherein the receptacle is a cup or mug.

14. A drip-type disposable coffee maker for use in a microwave device adapted to produce freshly brewed coffee for a receptable therebelow, comprising:
   a plastic container having two compartments, including:
   an upper compartment adapted to hold water to be heated by the microwave device having an opening in its top for receiving the water and microwave permeable peripheral walls,
   a lower compartment affixed to a lower end of said upper compartment adapted to hold a pre-measured amount of coffee therein, and having a bottom filter comprising porous paper for filtering brewed coffee therethrough,
   means on said lower end of said upper compartment and about said lower compartment for resting said container on a receptacle, and
   a partition between said compartments having a plurality of flow restricting perforations therethrough sealed by a non-toxic thermally responsive meltable material which melts at the temperature the water is heated to by the microwave device for brewing coffee, whereupon the heated water will flow through the perforations and coffee and become freshly brewed coffee which, in turn, will flow through said filter and into the receptacle therebelow.

* * * * *